United States Patent [19]

Takeshima et al.

[11] Patent Number: 5,471,836
[45] Date of Patent: Dec. 5, 1995

[54] EXHAUST PURIFICATION DEVICE OF INTERNAL COMBUSTION ENGINE

[75] Inventors: Shinichi Takeshima; Yasushi Araki; Shinya Hirota, all of Susono, Japan

[73] Assignee: Toyota Jidosha Kabushiki Kaisha, Toyota, Japan

[21] Appl. No.: 75,518

[22] PCT Filed: Oct. 13, 1992

[86] PCT No.: PCT/JP92/01330

§ 371 Date: Jun. 14, 1993

§ 102(e) Date: Jun. 14, 1993

[87] PCT Pub. No.: WO93/08383

PCT Pub. Date: Apr. 29, 1993

[30] Foreign Application Priority Data

Oct. 14, 1991 [JP] Japan .................................. 3-291870

[51] Int. Cl.$^6$ ....................................................... F01N 3/00
[52] U.S. Cl. ................................ 60/297; 60/285; 60/286; 422/169; 423/212
[58] Field of Search ............................ 60/224, 289, 301, 60/297, 285, 286; 422/169; 423/212, 213.7

[56] References Cited

U.S. PATENT DOCUMENTS

| | | |
|---|---|---|
| 3,086,353 | 4/1963 | Ridgway . |
| 3,303,003 | 2/1967 | Zimmer . |
| 3,716,996 | 2/1973 | Maruoka . |
| 3,747,346 | 7/1993 | Onoda et al. . |
| 3,795,730 | 3/1974 | Kalvinskas . |
| 3,926,590 | 12/1975 | Aibe et al. . |
| 4,009,244 | 2/1977 | Atsukawa ..................... 423/235 |
| 4,024,219 | 5/1977 | Takahashi ..................... 423/235 |
| 4,033,123 | 7/1977 | Masaki et al. . |
| 4,104,361 | 8/1978 | Nishikawa et al. . |
| 4,615,173 | 10/1986 | Usui et al. . |
| 4,760,044 | 7/1988 | Joy, III et al. . |
| 4,780,447 | 10/1988 | Kim et al. . |
| 4,868,148 | 9/1989 | Henk et al. . |
| 5,041,407 | 8/1991 | Williamson et al. . |
| 5,090,200 | 2/1992 | Arai . |
| 5,116,800 | 5/1992 | Williamson et al. . |
| 5,189,876 | 3/1993 | Hirota et al. . |
| 5,207,990 | 5/1993 | Sekiya et al. . |
| 5,243,819 | 9/1993 | Woerner et al. . |

FOREIGN PATENT DOCUMENTS

| | | |
|---|---|---|
| 0503882 | 3/1992 | European Pat. Off. . |
| 0496526 | 7/1992 | European Pat. Off. . |
| 53-115687 | 10/1978 | Japan . |
| 60-182325 | 9/1985 | Japan . |

(List continued on next page.)

OTHER PUBLICATIONS

J. Chem. Soc., Chem. Comm., No Removal by Absorption into BaO–CuO Binary Oxides, pp. 1165–1166.
Journal of Solid State Chemistry, FOrmation and Decomposition of $BaCuO_{2.5}$ Prepared from a Mixture of Nitrates, pp. 176–179.
Catalyst vol. 33 No. 2, No Removal by Absorption into Ba–Cu–O Binary Oxides, pp. 87–90.
Patent Abstracts of Japan, vol. 11, No. 317 (C–452) (2764) Oct. 15, 1987 & JP–A–62 106 826 (Nippon Shokubai Kagaku Kogyo) May 18, 1987 * abstract *.

*Primary Examiner*—Douglas Hart
*Attorney, Agent, or Firm*—Kenyon & Kenyon

[57] ABSTRACT

An $NO_x$ absorbent (19) is disposed in an exhaust passage of an internal combustion engine and an $NO_x$ oxidizing agent (18) is disposed in the exhaust passage upstream of the $NO_x$ absorbent (19). The $NO_x$ absorbent (19) absorbs the $NO_x$ when the air-fuel ratio of the exhaust gas flowing into the $NO_x$ absorbent (19) is lean and releases the absorbed $NO_x$ when the air-fuel ratio of the exhaust gas flowing into the $NO_x$ absorbent (19) becomes the stoichiometric air-fuel ratio or rich. When the lean air-fuel mixture is burned, if the temperature of the $NO_x$ absorbent (19) is low, the $NO_x$ oxidized by the $NO_x$ oxidizing agent (18) is absorbed by the $NO_x$ absorbent (19), while if the temperature of the $NO_x$ absorbent (19) is high, the $NO_x$ is oxidized by the $NO_x$ absorbent (19) and absorbed in the $NO_x$ absorbent (19).

28 Claims, 10 Drawing Sheets

FOREIGN PATENT DOCUMENTS

| | | |
|---|---|---|
| 61-112715 | 5/1986 | Japan . |
| 6297630 | 5/1987 | Japan . |
| 62117620 | 5/1987 | Japan . |
| 64-30643 | 2/1989 | Japan . |
| 2-149715 | 6/1990 | Japan . |
| 3-124909 | 5/1991 | Japan . |
| 3135417 | 6/1991 | Japan . |

RICH ← STOICHIOMETRIC → LEAN
AIR-FUEL RATIO

EXHAUST PURIFICATION DEVICE OF INTERNAL COMBUSTION ENGINE

TECHNICAL FIELD

The present invention relates to a exhaust purification device of an internal combustion engine.

BACKGROUND ART

A diesel engine in which an engine exhaust passage is branched to a pair of exhaust branch passages for purifying $NO_x$, a switching valve is disposed at the branched portion of these exhaust branch passages to alternately guide the exhaust gas to one of the exhaust branch passages by a switching function of the switching valve, and a catalyst which can oxidize and absorb the $NO_x$ is disposed in each of the exhaust branch passages is well known (refer to Japanese Unexamined Patent Publication No. 62-106826). In this diesel engine, $NO_x$ in the exhaust gas introduced into one exhaust branch passage is oxidized and absorbed by the catalyst disposed in that exhaust branch passage. During this time, the inflow of the exhaust gas to the other exhaust branch passage is stopped and, at the same time, a gaseous reducing agent is fed into this exhaust branch passage. The $NO_x$ accumulated in the catalyst disposed in this exhaust branch passage is reduced by this reducing agent. Subsequently, after a short time, the introduction of the exhaust gas to the exhaust branch passage to which the exhaust gas had been introduced heretofore is stopped by the switching function of the switching valve, and the introduction of the exhaust gas to the exhaust branch passage to which the introduction of the exhaust gas had been stopped heretofore is started again.

However, when the temperature of the catalyst becomes low, the oxidation and absorption of $NO_x$ can no longer be carried out. Therefore, in this diesel engine, when the temperature of the exhaust gas becomes low and therefore the temperature of the catalyst is low, the $NO_x$ is not oxidized and absorbed and therefore there is the problem that $NO_x$ is discharged to the atmosphere.

DISCLOSURE OF THE INVENTION

An object of the present invention is to provide an exhaust purification device which can efficiently absorb $NO_x$ even when the temperature of the exhaust gas is low.

According to the present invention, there is provided an exhaust purification device of an internal combustion engine wherein an $NO_x$ absorbent which absorbs the $NO_x$ when an air-fuel ratio of an inflowing exhaust gas is lean, while releasing the absorbed $NO_x$ when the concentration of oxygen in the inflowing exhaust gas is lowered is disposed in an engine exhaust passage, an $NO_x$ oxidizing agent which can oxidize $NO_x$ is disposed in the engine exhaust passage upstream of the $NO_x$ absorbent, and the $NO_x$ absorbed in the $NO_x$ absorbent when the exhaust gas flowing into the $NO_x$ absorbent is lean, is released from the absorbent when the oxygen concentration in the exhaust gas flowing into the $NO_x$ absorbent is lowered.

BEST MODE FOR CARRYING OUT THE INVENTION

Figure 1:
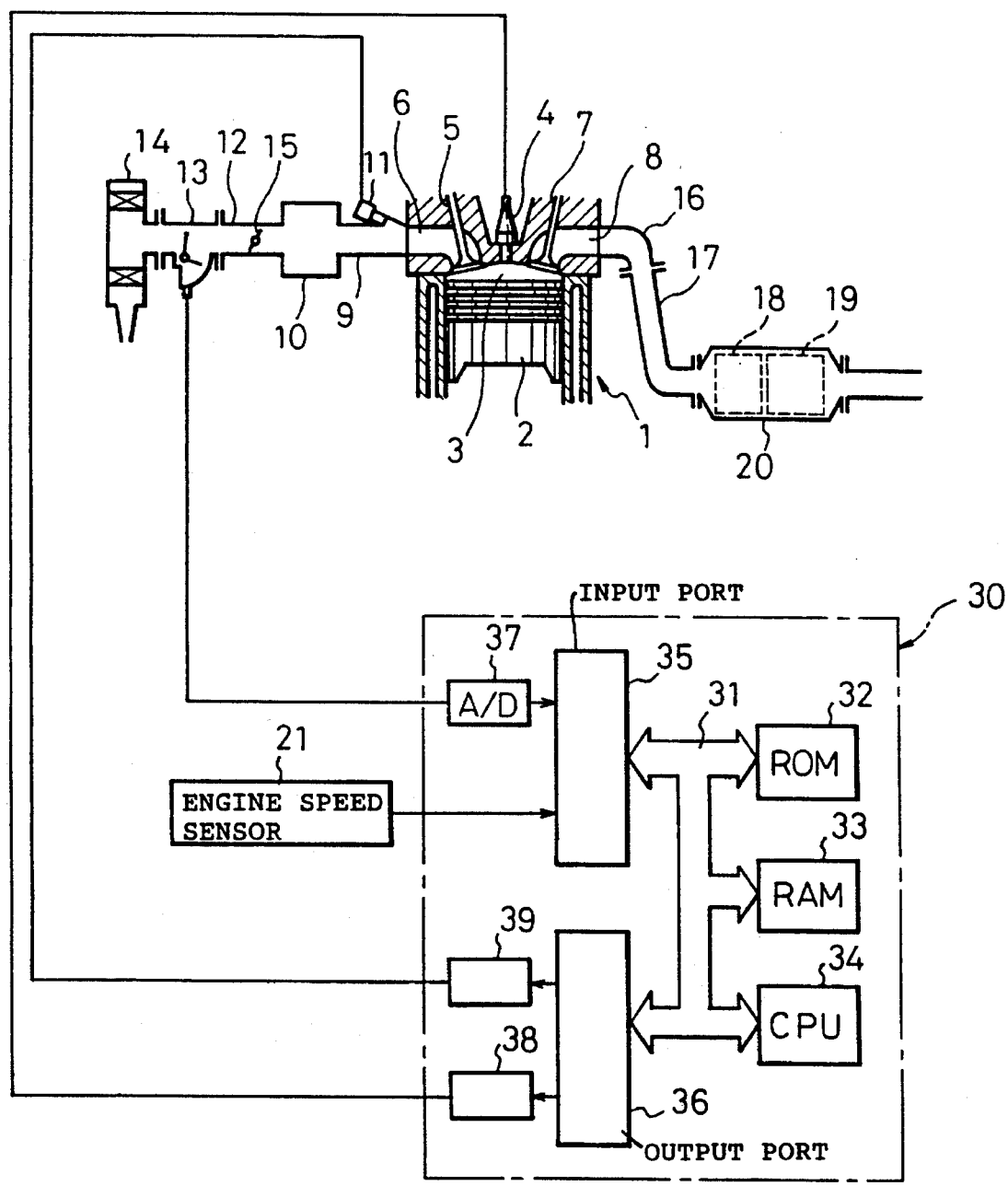
FIG. 1 is an overall view of an internal combustion engine.

FIG. 1 shows a case where the present invention is applied to a gasoline engine.

Referring to FIG. 1, 1 denotes an engine body; 2 a piston; 3 a combustion chamber; 4 a spark plug; 5 an intake valve; 6 an intake port; 7 an exhaust valve; and 8 an exhaust port, respectively. The intake port 6 is connected to a surge tank 10 via a corresponding branch pipe 9, and a fuel injector 11 injecting the fuel toward the interior of the intake port 6 is attached to each branch pipe 9. The surge tank 10 is connected to an air cleaner 14 via an intake duct 12 and an air flow meter 13, and a throttle valve 15 is disposed in the intake duct 12. On the other hand, the exhaust port 8 is connected via an exhaust manifold 16 and an exhaust pipe 17 to a casing 20 including an $NO_x$ oxidizing agent 18 and an $NO_x$ absorbent 19 therein. As shown in FIG. 1, the $NO_x$ oxidizing agent 18 is provided immediately upstream of the $NO_x$ absorbent 19 in the same casing 20.

An electronic control unit 30 comprises a digital computer and is provided with a ROM (read only memory) 32, a RAM (random access memory) 33, a CPU (microprocessor) 34, an input port 35, and an output port 36, which are interconnected by a bidirectional bus 31. The air flow meter 13 generates an output voltage proportional to the amount of intake air, and this output voltage is input via an AD converter 37 to the input port 35. An engine speed sensor 21 generating an output pulse expressing the engine speed is connected to the input port 35. On the other hand, the output port 36 is connected via the corresponding driving circuits 38 and 39 to the spark plug 4 and fuel injector 11, respectively.

Figure 2:
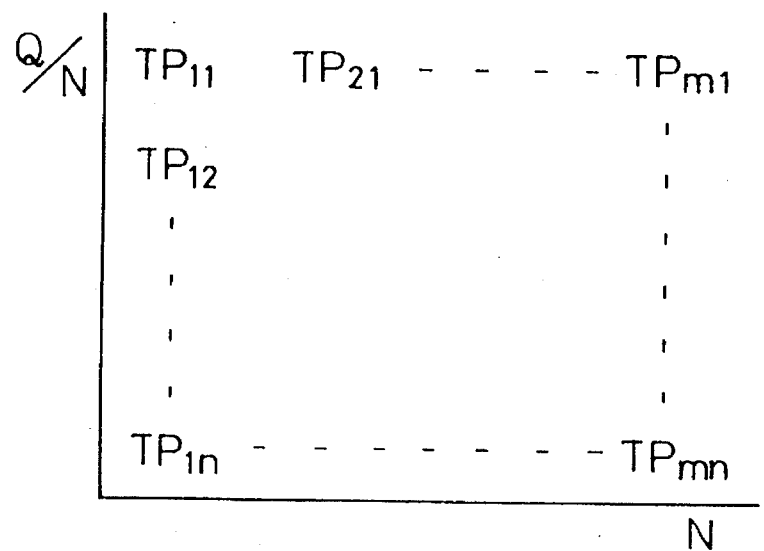
FIG. 2 is a diagram showing a map of a basic fuel injection time.

In the internal combustion engine shown in FIG. 1, the fuel injection time TAU is calculated based on for example the following equation.

$$TAU=TP \cdot K$$

where, TP is a basic fuel injection time, and K is a correction coefficient. The basic fuel injection time TP shows the fuel injection time necessary for bringing the air-fuel ratio of an air-fuel mixture fed into the engine cylinder to the stoichiometric air-fuel ratio. This basic fuel injection time TP is found in advance by experiments and is stored in advance in the ROM 32 in the form of a map as shown in FIG. 2 as the function of an engine load Q/N (intake air amount Q/engine speed N) and the engine speed N. The correction coefficient K is a coefficient for controlling the air-fuel ratio of the air-fuel mixture fed into the engine cylinder, and if K=1.0, the air-fuel mixture fed into the engine cylinder becomes the stoichiometric air-fuel ratio. Contrary to this, when K becomes smaller than 1.0, the air-fuel ratio of the air-fuel mixture fed into the engine cylinder becomes larger than the stoichiometric air-fuel ratio, that is, becomes lean, and when K becomes larger than 1.0, the air-fuel ratio of the air-fuel mixture fed into the engine cylinder becomes smaller than the stoichiometric air-fuel ratio, that is, becomes rich.

Figure 3:
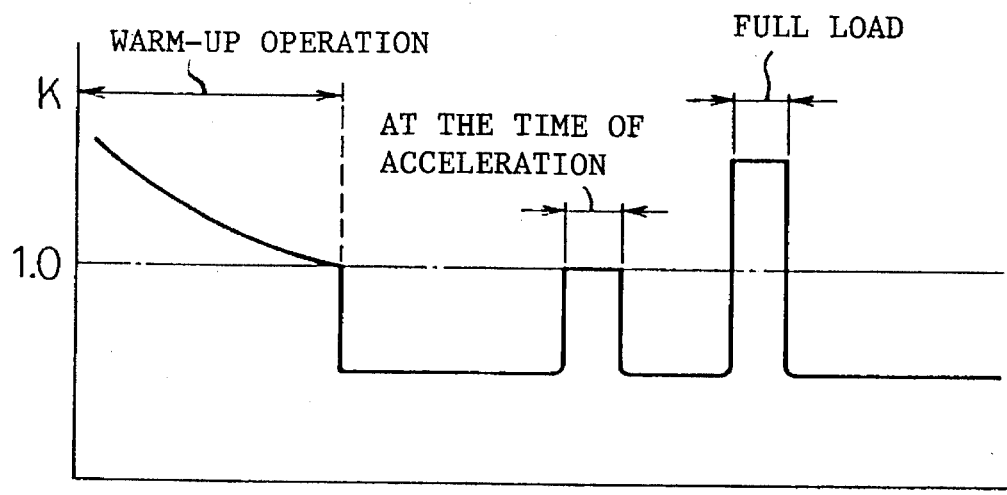
FIG. 3 is a diagram showing a change of a correction coefficient K.

This correction coefficient K is controlled in accordance with the operating state of the engine. FIG. 3 shows one embodiment of the control of this correction coefficient K. In the embodiment shown in FIG. 3, during a warm-up operation, the correction coefficient K is gradually lowered as the engine cooling water temperature becomes higher. When the warm-up is completed, the correction coefficient K is maintained at a constant value smaller than 1.0, that is, the air-fuel ratio of the air-fuel mixture fed into the engine cylinder is maintained as lean. Subsequently, when an acceleration operation is carried out, the correction coefficient K is brought to, for example, 1.0, that is, the air-fuel ratio of the air-fuel mixture fed into the engine cylinder is brought to the stoichiometric air-fuel ratio. When a full load operation is carried out, the correction coefficient K is made larger than 1.0. Namely, the air-fuel ratio of the air-fuel mixture fed into the engine cylinder is made rich. As seen from FIG. 3, in the embodiment shown in FIG. 3, except for the time of the warm-up operation, the time of the acceleration operation, and the time of the full load operation, the air-fuel ratio of the air-fuel mixture fed into the engine cylinder is maintained at a constant lean air-fuel ratio, and accordingly the lean air-fuel mixture is burned in a majority of the engine operation region.

Figure 4:
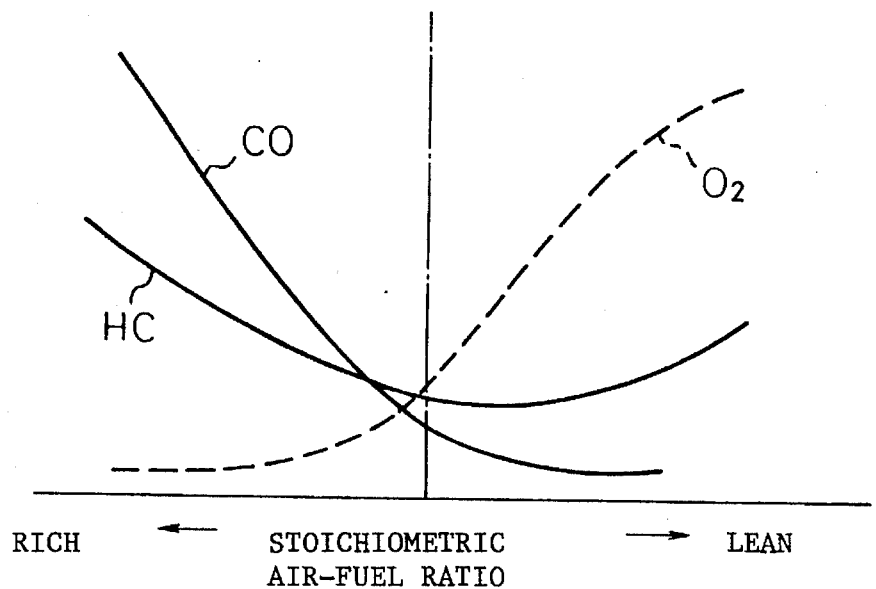
FIG. 4 is a graph schematically showing the concentration of unburnt HC and CO in the exhaust gas and oxygen discharged from the engine.

FIG. 4 schematically shows the concentration of representative components in the exhaust gas discharged from the combustion chamber 3. As seen from FIG. 4, the concentration of the unburnt HC and CO in the exhaust gas discharged from the combustion chamber 3 is increased as the air-fuel ratio of the air-fuel mixture fed into the combustion chamber 3 becomes richer, and the concentration of the oxygen $O_2$ in the exhaust gas discharged from the combustion chamber 3 is increased as the air-fuel ratio of the air-fuel mixture fed into the combustion chamber 3 becomes leaner.

The $NO_x$ absorbent 19 contained in the casing 20 uses, for example, alumina as a carrier. On this carrier, at least one substance selected from alkali metals, for example, potassium K, sodium Na, lithium Li, and cesium Cs; alkali earth metals, for example, barium Ba and calcium Ca; and rare earth metals, for example, lanthanum La and yttrium Y and precious metals such as platinum Pt is carried. When referring to the ratio between the air and fuel (hydrocarbons) fed into the intake passage of the engine and the exhaust passage upstream of the $NO_x$ absorbent 19 as the air-fuel ratio of the inflowing exhaust gas to the $NO_x$ absorbent 19, this $NO_x$ absorbent 19 performs the absorption and releasing operation of $NO_x$ by absorbing the $NO_x$ when the air-fuel ratio of the inflowing exhaust gas is lean, while releasing the absorbed $NO_x$ when the concentration of oxygen in the inflowing exhaust gas falls. Note that, where the fuel (hydrocarbons) or air is not fed into the exhaust passage upstream of the $NO_x$ absorbent 19, the air-fuel ratio of the inflowing exhaust gas coincides with the air-fuel ratio of the air-fuel mixture fed into the combustion chamber 3, and accordingly in this case, the $NO_x$ absorbent 19 absorbs the $NO_x$ when the air-fuel ratio of the air-fuel mixture fed into the combustion chamber 3 is lean and releases the absorbed $NO_x$ when the concentration of oxygen in the air-fuel mixture fed into the combustion chamber 3 is lowered.

When the above-mentioned $NO_x$ absorbent 19 is disposed in the exhaust passage of the engine, this $NO_x$ absorbent 19 actually performs the absorption and releasing operation of $NO_x$, but there are areas of the exact mechanism of this absorption and releasing operation which are not clear. However, it can be considered that this absorption and releasing operation is conducted by the mechanism as shown in FIG. 5. This mechanism will be explained by using as an example a case where platinum Pt and barium Ba are carried on the carrier, but a similar mechanism is obtained even if another precious metal, alkali metal, alkali earth metal, or rare earth metal is used.

Figure 5A:
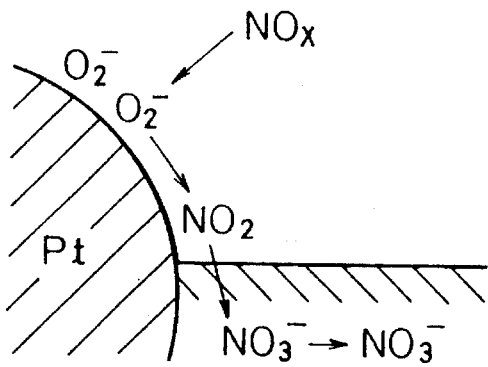
FIG. 5 is a diagram for explaining an absorption and releasing operation of the $NO_x$.

Namely, when the inflowing exhaust gas becomes considerably lean, the concentration of oxygen in the inflowing exhaust gas is greatly increased. As shown in FIG. 5(A), the oxygen $O_2$ is deposited on the surface of the platinum Pt in the form of $O_2^-$. On the other hand, the NO in the inflowing exhaust gas reacts with the $O_2^-$ on the surface of the platinum Pt and becomes $NO_2$ ($2NO+O_2 \rightarrow 2NO_2$). Subsequently, a part of the produced $NO_2$ is oxidized on the platinum Pt and absorbed into the absorbent. While bonding with the barium oxide BaO, it is diffused in the absorbent in the form of nitric acid ions $NO_3^-$ as shown in FIG. 5(A). In this way, $NO_x$ is absorbed into the $NO_x$ absorbent 19.

So long as the oxygen concentration in the inflowing exhaust gas is high, the $NO_x$ is produced on the surface of the platinum Pt, and so long as the $NO_x$ absorption ability of the absorbent is not saturated, the $NO_x$ is absorbed into the absorbent and nitric acid ions $NO_3^-$ are produced. Contrary to this, when the oxygen concentration in the inflowing exhaust gas is lowered and the production of $NO_2$ is lowered, the reaction proceeds in an inverse direction ($NO_3^- \rightarrow NO_2$), and thus nitric acid ions $NO_3^-$ in the absorbent are released in the form of $NO_2$ from the absorbent. Namely, when the oxygen concentration in the inflowing exhaust gas is lowered, the $NO_x$ is released from the $NO_x$ absorbent 19. As shown in FIG. 4, when the degree of leanness of the inflowing exhaust gas becomes low, the oxygen concentration in the inflowing exhaust gas is lowered, and accordingly when the degree of leanness of the inflowing exhaust gas is lowered, the $NO_x$ is released from the $NO_x$ absorbent 19 even if the air-fuel ratio of the inflowing exhaust gas is lean.

Figure 5B:
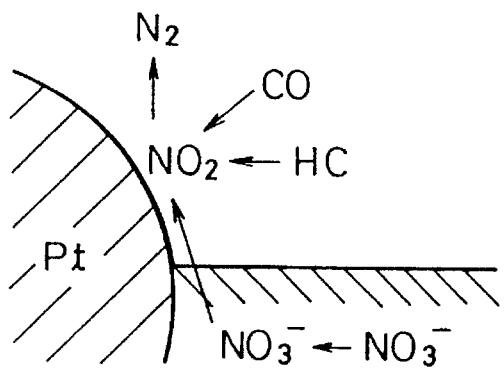

On the other hand, at this time, when the air-fuel ratio of the air-fuel mixture fed into the combustion chamber 3 is made rich and the air-fuel ratio of the inflowing exhaust gas becomes rich, as shown in FIG. 4, a large amount of unburnt HC and CO is discharged from the engine, and these unburnt HC and CO react with the oxygen $O_2^-$ on the platinum Pt and are oxidized. Also, when the air-fuel ratio of the inflowing exhaust gas becomes rich, the oxygen concentration in the inflowing exhaust gas is extremely lowered, and therefore the $NO_2$ is released from the absorbent. This $NO_2$ reacts with the unburnt HC and CO as shown in FIG. 5(B) and is reduced. In this way, when the $NO_2$ no longer exists on the surface of the platinum Pt, the $NO_2$ is successively released from the absorbent. Accordingly, when the air-fuel ratio of the inflowing exhaust gas is made rich, the $NO_x$ is released from the $NO_x$ absorbent 19 in a short time.

Namely, when the air-fuel ratio of the inflowing exhaust gas is made rich, first of all, the unburnt HC and CO immediately react with the $O_2^-$ on the platinum Pt and are oxidized, and subsequently if the unburnt HC and CO still remain even though the $O_2^-$ on the platinum Pt is consumed, the $NO_x$ released from the absorbent and the $NO_x$ released from the engine are reduced by these unburnt HC and CO. Accordingly, when the air-fuel ratio of the inflowing exhaust gas is made rich; the $NO_x$ absorbed in the $NO_x$ absorbent 19 is released in a short time and in addition this released $NO_x$ is reduced, and therefore the discharge of $NO_x$ into the atmosphere can be blocked. Also, since the $NO_x$ absorbent 19 has the function of a reduction catalyst, even if the air-fuel ratio of the inflowing exhaust gas is made the stoichiometric air-fuel ratio, the $NO_x$ released from the $NO_x$ absorbent 19 can be reduced. However, where the air-fuel ratio of the inflowing exhaust gas is made the stoichiometric air-fuel ratio, the $NO_x$ is released merely gradually from the $NO_x$ absorbent 19, and therefore a slightly long time is required for releasing all $NO_x$ absorbed in the $NO_x$ absorbent 19.

When the degree of leanness of the inflowing exhaust gas is lowered as mentioned before, even if the air-fuel ratio of the inflowing exhaust gas is lean, the $NO_x$ is released from the $NO_x$ absorbent 19. Accordingly, to release the $NO_x$ from the $NO_x$ absorbent 19, it is satisfactory if the concentration of oxygen in the inflowing exhaust gas is lowered. Note, even if the $NO_x$ is released from the $NO_x$ absorbent 19, when the air-fuel ratio of the inflowing exhaust gas is lean, the $NO_x$ is not reduced in the $NO_x$ absorbent 19, and accordingly, in this case, it is necessary to provide a catalyst which can reduce the $NO_x$ downstream of the $NO_x$ absorbent 19 or supply a reducing agent downstream of the $NO_x$ absorbent 19. Of course, it is also possible to reduce the $NO_x$ downstream of the $NO_x$ absorbent 19 in this way, but it is rather preferable that the $NO_x$ be reduced in the $NO_x$ absorbent 19. Accordingly, in the embodiment according to the present invention, when the $NO_x$ should be released from the $NO_x$ absorbent 19, the air-fuel ratio of the inflowing exhaust gas is made the stoichiometric air-fuel ratio or rich, whereby the $NO_x$ released from the $NO_x$ absorbent 19 is reduced in the $NO_x$ absorbent 19.

Figure 6:
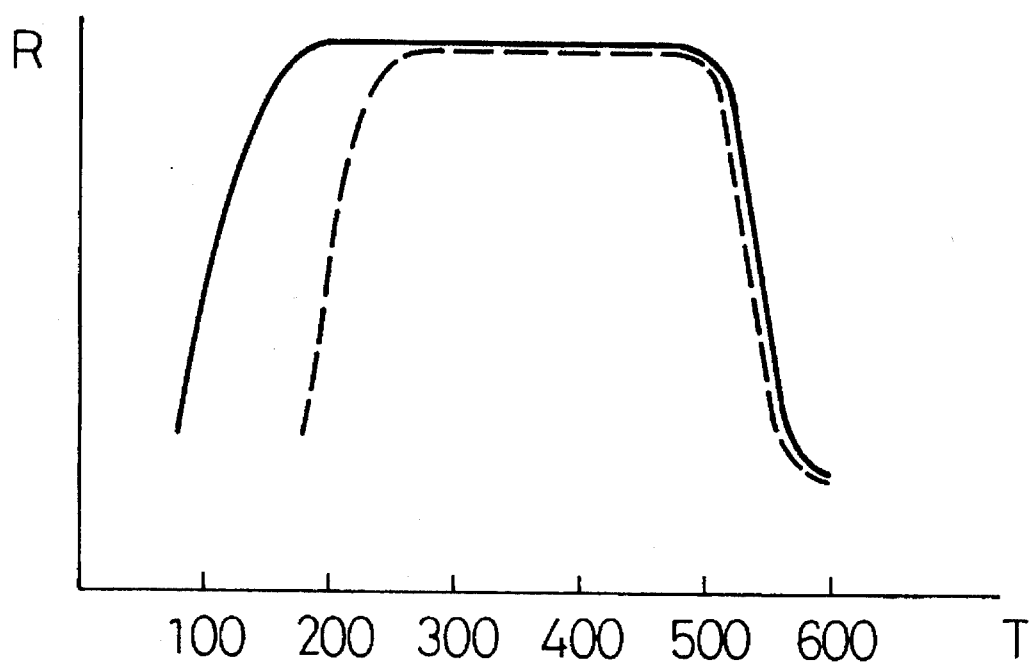
FIG. 6 is a diagram showing an absorption rate of $NO_x$.

FIG. 6 shows the absorption rate R of the $NO_x$ absorbed into the $NO_x$ absorbent 19 when the air-fuel ratio of the inflowing exhaust gas is lean. Note that, the abscissa T shows the temperature of the $NO_x$ absorbent 19. In actuality, the temperature T of the $NO_x$ absorbent 19 becomes almost equal to the temperature of the exhaust gas flowing into the $NO_x$ absorbent 19. As seen from the broken line of FIG. 6, when the temperature of the $NO_x$ absorbent 19 becomes lower than about 200° C., the oxidation function of $NO_x$ ($2NO+O_2 \rightarrow 2NO_2$) is weakened, and therefore the $NO_x$ absorption rate R is lowered. On the other hand, when the temperature T of the $NO_x$ absorbent 19 becomes higher than about 500° C., the $NO_x$ absorbed in the $NO_x$ absorbent 19 is decomposed and naturally released from the $NO_x$ absorbent 19, and therefore the $NO_x$ absorption rate is lowered. Accordingly, the $NO_x$ is absorbed well into the $NO_x$ absorbent 19 when the temperature T of the $NO_x$ absorbent 19 is within the predetermined temperature range (about 200° C.<T< about 500° C.).

In actuality, however, just after the start of the engine of course and also after the completion of engine warmup, if the engine load becomes small, the temeprature of the exhaust gas becomes considerably low and as a result the $NO_x$ absorbent 19 becomes considerably lower than 200° C. as well. In this way, if the temperature of the $NO_x$ absorbent 19 becomes considerably lower than 200° C., as shown by the broken line in FIG. 6, the $NO_x$ absorbent 19 no longer absorbs the $NO_x$, so the $NO_x$ is discharged.

The reason why when the temperature of the $NO_x$ absorbent becomes lower than 200° C., the $NO_x$ absorbent 19 no longer absorbs the $NO_x$ is that the $NO_3^-$ no longer diffuses into the absorbent and so as mentioned above the oxidation action ($2NO+O_2 \rightarrow 2NO_2$) by the platinum Pt is weakened. In other words, even if the temperature of the $NO_x$ absorbent 19 becomes lower than 200° C., if the $NO_x$ oxidizes, the $NO_x$ is diffuses in the absorbent in the form of $NO_3^-$ and therefore to ensure that when the temperature of the $NO_x$ absorbent 19 becomes lower than 200° C., the $NO_x$ is absorbed in the $NO_x$ absorbent 19, it is sufficient to promote the oxidation function ($2NO+O_2 \rightarrow 2NO_2$) of the $NO_x$. Toward that end, in the embodiment shown in the present invention, the $NO_x$ oxidizing agent 18 is provided upstream of the $NO_x$ absorbent.

The $NO_x$ oxidizing agent 18 is comprised of a catalyst consisting of at least one compound selected from platinum Pt, palladium Pd, ceria $CeO_2$, lanthancobaltperovskite $LaCoO_3$, or vanadium pentaoxide $V_2O_5$. The $NO_x$ oxidizing agent 18 can oxidize $NO_x$ within a range of temperature of the $NO_x$ oxidizing agent 18 of 100° C. to 250° C. Therefore, if the $NO_x$ oxidizing agent 18 is disposed upstream of the $NO_x$ absorbent 19, even if the temperature of the exhaust gas becomes lower and the temperature of the $NO_x$ absorbent 19 falls below 200° C., there will be an $NO_x$ oxidation action ($2NO+O_2 \rightarrow 2NO_2$) due to the $NO_x$ oxidizing agent 18, so the $NO_x$ will be absorbed well by the $NO_x$ absorbent 19. Accordingly, as shown by the broken line in FIG. 6, the range of temperature wherein the $NO_x$ can be absorbed by the $NO_x$ absorbent 19 widens to about 100° C.<T<about 500° C. and therefore it becomes possible for the $NO_x$ to be absorbed by the $NO_x$ absorbent 19 in the entire operating region of the engine except for directly after the start of the engine.

Note that if the $NO_2$ oxidized by the $NO_x$ oxidizing agent 18 is left as it is, it returns to $NO_x$ in a relatively short time. Therefore, to ensure that before the $NO_2$ returns to $NO_x$, the $NO_2$ is absorbed in the $NO_x$ absorbent 19, the $NO_x$ oxidizing agent 18 is disposed near to the $NO_x$ absorbent 19.

As shown in FIG. 3, in the embodiment according to the present invention, the air-fuel mixture fed into the combustion chamber 3 is made rich at the time of the warm-up operation and at the time of the full load operation, and the air-fuel mixture is made the stoichiometric air-fuel ratio at the time of the acceleration operation, but the lean air-fuel mixture is burned in the combustion chamber 3 in the majority of the operation region other than these. In this case, the air-fuel ratio of the air-fuel mixture burned in the combustion chamber 3 is more than about 18.0. In the embodiment shown in FIG. 1, a lean air-fuel mixture having an air-fuel ratio of from about 20 to 24 is burned. When the air-fuel ratio becomes more than 18.0, even if the three-way catalyst has a reduction property under a lean air-fuel ratio, it cannot sufficiently reduce the $NO_x$, and accordingly the three-way catalyst cannot be used so as to reduce the $NO_x$ under such a lean air-fuel ratio. Also, as a catalyst which can reduce the $NO_x$ even if the air-fuel ratio is more than 18.0, there is a Cu-zeolite catalyst, but this Cu-zeolite catalyst lacks heat resistance, and therefore the use of this Cu-zeolite catalyst is not preferable in practice. Accordingly, in the end, there is no method of purifying the $NO_x$ when the air-fuel ratio is more than 18.0 other than the method of using the $NO_x$ absorbent 19 which is used in the present invention.

Figure 7A:
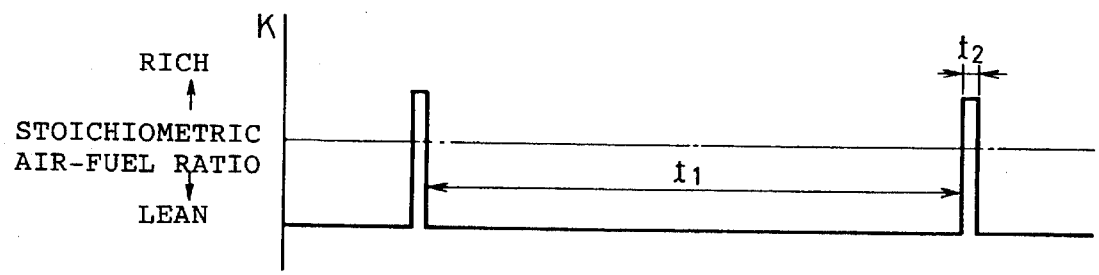
FIG. 7 is a diagram showing a control of the air-fuel ratio.
Figure 7B:
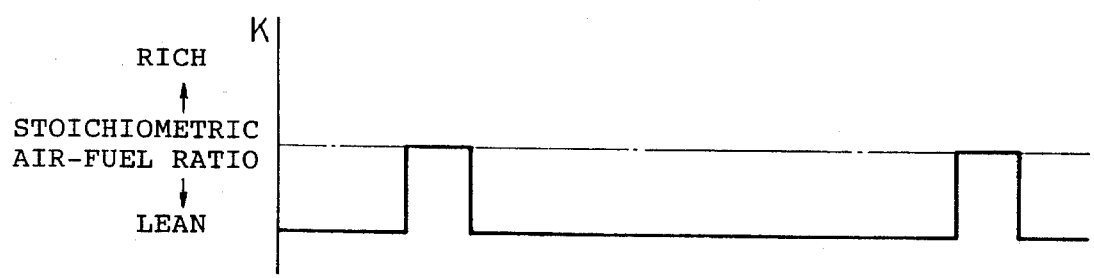
Figure 7C:
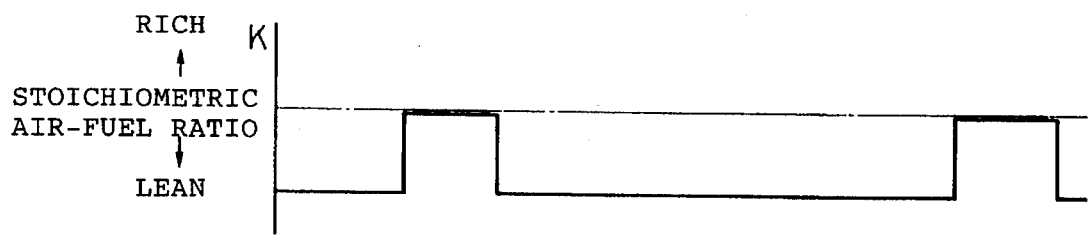

In the embodiment according to the present invention, as mentioned above, the air-fuel ratio of the air-fuel mixture fed into the combustion chamber 3 is made rich at the time of the full load operation, and that of the air-fuel mixture is made the stoichiometric air-fuel ratio at the time of the acceleration operation, and therefore $NO_x$ is released from the $NO_x$ absorbent 18 at the time of the full load operation and at the time of the acceleration operation. However, when the frequency of such a full load operation or acceleration operation is low, even if the $NO_x$ is released from the $NO_x$ absorbent 19 only at the time of the full load operation and acceleration operation, the absorption ability of the $NO_x$ by the $NO_x$ absorbent 19 is saturated during the period where the lean air-fuel mixture is burned, and thus the $NO_x$ is no longer absorbed by the $NO_x$ absorbent 19. Accordingly, in the embodiment according to the present invention, when the lean air-fuel mixture is continuously burned, as shown in FIG. 7(A), the air-fuel ratio of the inflowing exhaust gas is periodically made rich, or the air-fuel ratio of the inflowing exhaust gas is periodically made the stoichiometric air-fuel ratio as shown in FIG. 7(B). Note that, in this case, as shown in FIG. 7(C), it is also possible to periodically lower the degree of leanness, but in this case, the $NO_x$ is not reduced in the $NO_x$ absorbent 19, and therefore, as mentioned before, the $NO_x$ must be reduced downstream of the $NO_x$ absorbent 19.

As shown in FIG. 7(A), looking at the case where the air-fuel ratio of the inflowing exhaust gas is periodically made rich, a time $t_2$ over which the air-fuel ratio of the inflowing exhaust gas is made rich is much shorter than the time $t_1$ over which the combustion of the lean air-fuel mixture is carried out. Concretely speaking, while the time $t_2$ over which the air-fuel ratio of the inflowing exhaust gas is made rich is less than about 10 seconds, the time $t_1$ over which the combustion of the lean air-fuel mixture is carried out becomes a time of from 10 odd minutes to one hour or more. Namely, in other words, $t_2$ becomes 50 times or more longer than $t_1$. This is true also in the cases shown in FIGS. 7(B) and 7(C).

The releasing operation of the $NO_x$ from the $NO_x$ absorbent 19 is carried out when a constant amount of $NO_x$ is absorbed into the $NO_x$ absorbent 19, for example when $NO_x$ of 50% of the absorption ability of the $NO_x$ absorbent 19 is absorbed. The amount of $NO_x$ absorbed into the $NO_x$ absorbent 19 is proportional to the amount of the exhaust gas discharged from the engine and the $NO_x$ concentration in the exhaust gas. In this case, the amount of the exhaust gas is proportional to the intake air amount, and the $NO_x$ concentration in the exhaust gas is proportional to the engine load, and therefore the amount of $NO_x$ absorbed into the $NO_x$ absorbent 19 is correctly proportional to the amount of intake air and the engine load. Accordingly, the amount of the $NO_x$ absorbed in the $NO_x$ absorbent 19 can be estimated from the cumulative value of the product of the amount of the intake air with the engine load, but in the embodiment according to the present invention, it is simplified and the amount of $NO_x$ absorbed in the $NO_x$ absorbent 19 is estimated from the cumulative value of the engine speed.

An explanation will be made next of one embodiment of absorption and releasing control of the $NO_x$ absorbent 19 according to the present invention with reference to FIG. 8.

Figure 8:
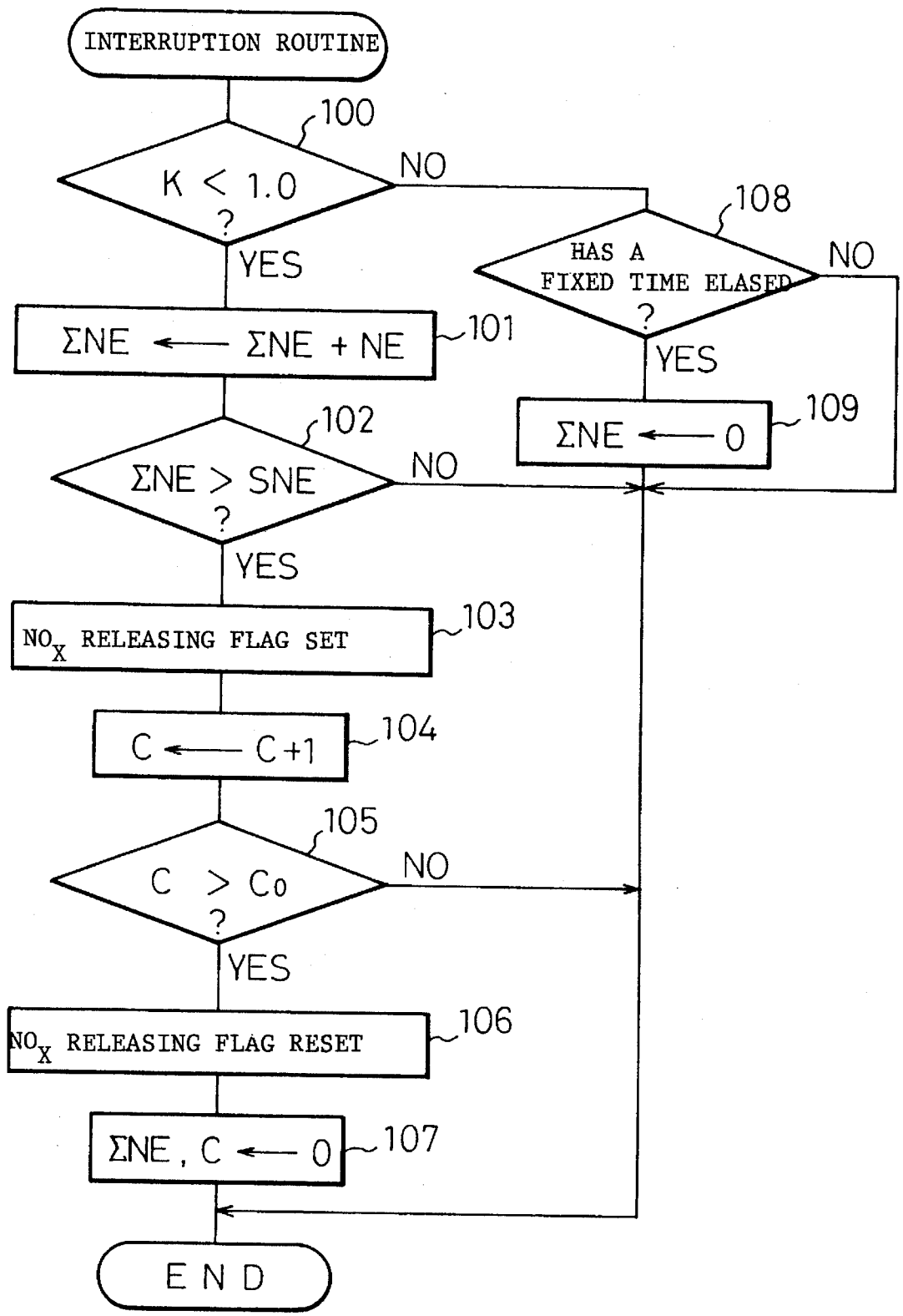
FIG. 8 is a flow chart showing an interruption routine.

FIG. 8 shows an interruption routine executed at predetermined time intervals.

Referring to FIG. 8, first, it is judged at step 100 whether or not the correction coefficient K with respect to the basic fuel injection time TP is smaller than 1.0, that is, whether or not the lean air-fuel mixture has been burned. When K<1.0, that is, when the lean air-fuel mixture has been burned, the processing routine goes to step 101, at which the result of addition of ΣNE to the current engine speed NE is defined as ΣNE. Accordingly, this ΣNE indicates the cumulative value of the engine speed NE. Subsequently, at step 102, it is judged whether or not the cumulative engine speed ΣNE is larger than the constant value SNE. This constant value SNE shows a cumulative engine speed from which it is estimated that $NO_x$ in an amount of for example 50% of the absorption ability of $NO_x$ is absorbed by the $NO_x$ absorbent 19. When ΣNE≦SNE, the processing cycle is completed, and when ΣNE>SNE, that is, when it is estimated that $NO_x$ in an amount of 50% of the $NO_x$ absorption ability of the $NO_x$ absorbent 19 is absorbed therein, the processing routine goes to step 103, at which the $NO_x$ releasing flag is set.

When the $NO_x$ releasing flag is set, as will be mentioned later, the air-fuel ratio of the air-fuel mixture fed into the engine cylinder is made rich.

Subsequently, at step 104, the count value C is incremented exactly by "1". Subsequently, at step 105, it is judged whether or not the count value C becomes larger than a constant value $C_O$, that is, whether or not for example five seconds have elapsed. When C≦$C_O$, the processing routine is completed, and when C becomes larger than $C_O$, the processing routine goes to step 106, at which the $NO_x$ releasing flag is reset. When the $NO_x$ releasing flag is reset, as will be mentioned later, the air-fuel ratio of the air-fuel mixture fed into the engine cylinder is switched from rich to lean, and thus the air-fuel ratio of the air-fuel mixture fed into the engine cylinder is made rich for 5 seconds. Subsequently, at step 107, the cumulative engine speed ΣNE and the count value C are brought to zero.

On the other hand, at step 100, when it is decided that K≧1.0, that is, when the air-fuel ratio of the air-fuel mixture fed into the engine cylinder is the stoichiometric air-fuel ratio or rich, the processing routine goes to step 108, at which it is judged whether or not the state of K≧1.0 is continued for a constant time, for example, 10 seconds. When the state of K≧1.0 is not continued for the predetermined time, the processing cycle is completed, and when the state of K≧1.0 is continued for the predetermined time, the processing routine goes to step 109, at which the cumulative engine speed ΣNE is brought to zero.

Namely, when the time over which the air-fuel mixture fed into the engine cylinder is made the stoichiometric air-fuel ratio or rich is continued for about 10 seconds, it can be considered that most of the $NO_x$ absorbed in the $NO_x$ absorbent 19 was released, and accordingly in this case, the cumulative engine speed ΣNE is brought to zero at step 109.

Figure 9:
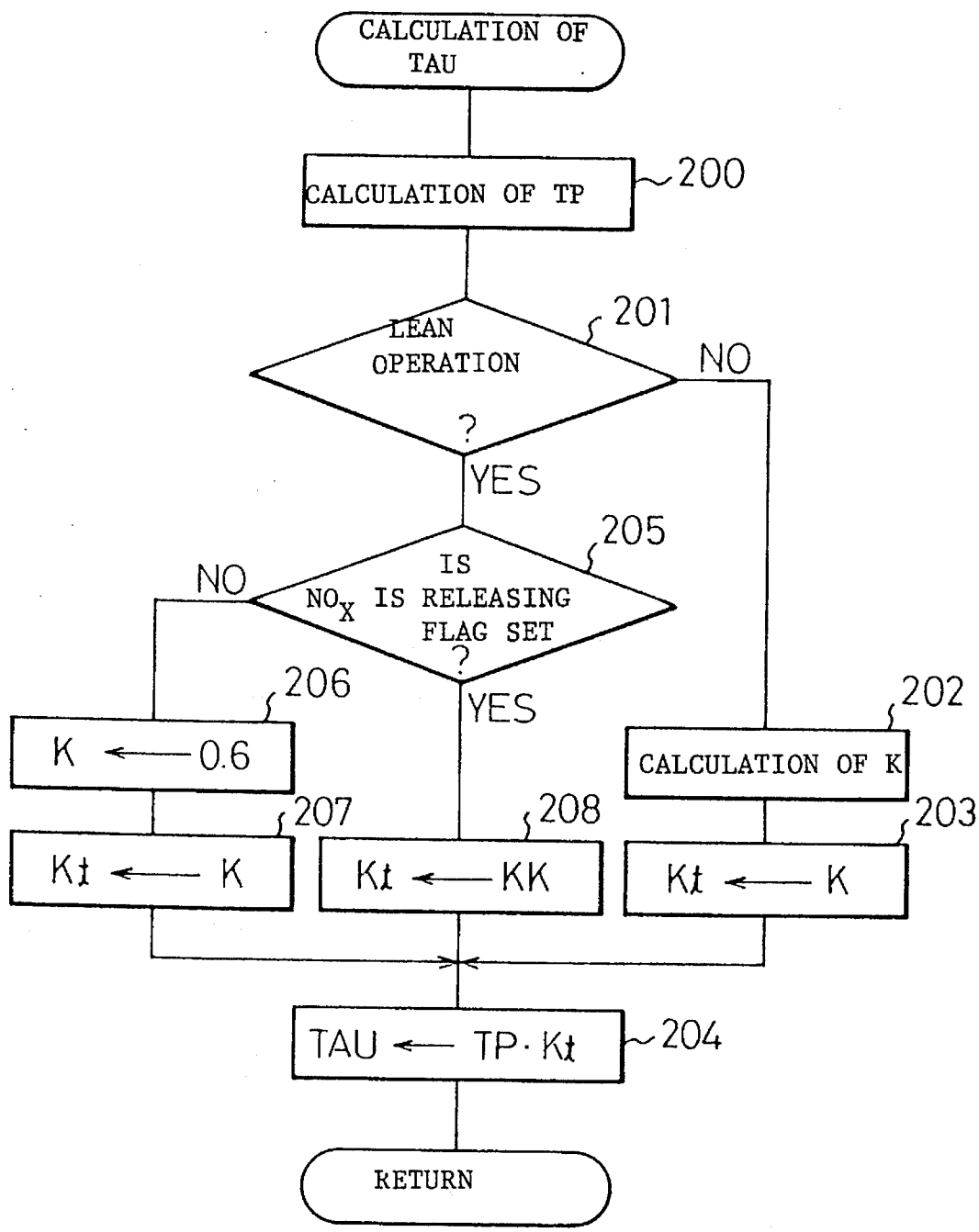
FIG. 9 is a flow chart for calculating a fuel injection time TAU.

FIG. 9 shows a calculation routine of the fuel injection time TAU. This routine is repeatedly executed.

Referring to FIG. 9, first, at step 200, a basic fuel injection time TP is calculated from a map indicated in FIG. 2. Subsequently, at step 201, it is judged whether or not the operation state is a state where combustion of the lean air-fuel mixture should be carried out. When it is not an operation state where combustion of the lean air-fuel mixture should be carried out, that is, at the time of the warm-up operation, acceleration operation, or full load operation, the processing routine goes to step 202, at which the correction coefficient K is calculated. At the time of an engine warm-up operation, this correction coefficient K is a function of the engine cooling water temperature and becomes smaller as the engine cooling water temperature becomes higher within a range indicated by K≧1.0. Also, at the time of the acceleration operation, the correction coefficient K is brought to 1.0, and at the time of the full load operation, the correction coefficient K is made a value larger than 1.0. Subsequently, at step 203, the correction coefficient K is made Kt, and subsequently, at step 204, the fuel injection time TAU (=TP·Kt) is calculated. At this time, the air-fuel mixture fed into the engine cylinder is made the stoichiometric air-fuel ratio or rich.

On the other hand, at step 201, when it is judged that the operation state is a state where combustion of the lean air-fuel mixture should be carried out, the processing routine goes to step 205, at which it is judged whether or not the $NO_x$ releasing flag has been set. When the $NO_x$ releasing flag has not been set, the processing routine goes to step 206, at which the correction coefficient K is made for example 0.6, and subsequently, at step 207, the correction coefficient K is changed to Kt, and then the processing routine goes to step 204. Accordingly, at this time, a lean air-fuel mixture is fed into the engine cylinder. On the other hand, when it is decided at step 205 that the $NO_x$ releasing flag was set, the processing routine goes to step 208, at which the preliminarily determined value KK is changed to Kt, and subsequently the processing routine goes to step 204. This value KK is a value of from about 1.1 to 1.2 with which the air-fuel ratio of the air-fuel mixture fed into the engine cylinder becomes about 12.0 to 13.5. Accordingly, at this time, the rich air-fuel mixture is fed into the engine cylinder, whereby the $NO_x$ absorbed in the $NO_x$ absorbent 18 is released. Note that, at the releasing of $NO_x$, where the air-fuel mixture is to be made the stoichiometric air-fuel ratio, the value of KK is brought to 1.0.

Figure 10:
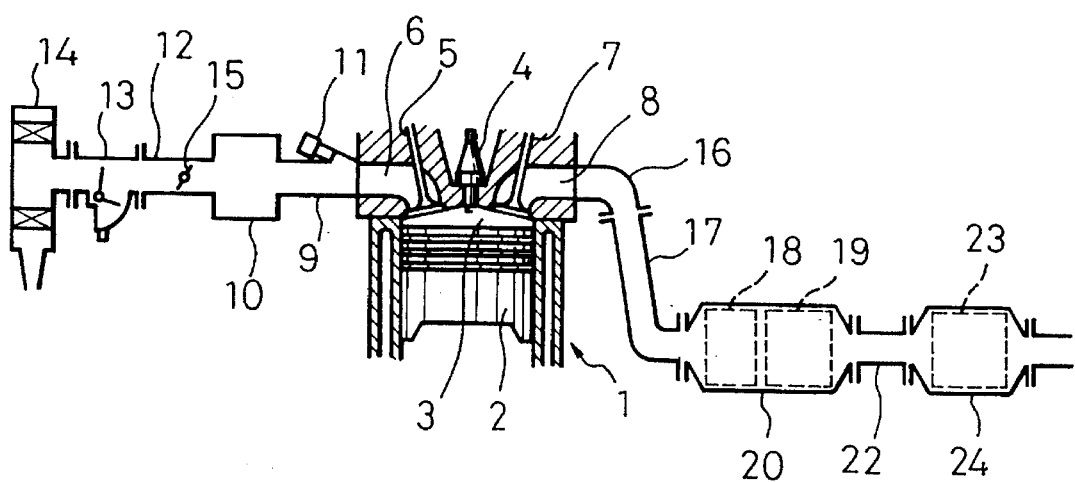
FIG. 10 is an overall view showing another embodiment of the internal combustion engine.

FIG. 10 indicates another embodiment. In this embodiment, the same constituent elements as those shown in FIG. 1 are indicated by the same reference numerals.

In this embodiment, the outlet side of the casing 20 is connected to the catalytic converter 24 housing the three-way catalyst 23 through the exhaust pipe 22. This three-way catalyst 23, as is well known, exhibits a high purification efficiency with respect to CO, HC, and $NO_x$ when the air-fuel ratio is maintained near the stoichiometric air-fuel ratio and has a high purification efficiency with respect to $NO_x$ even when the air-fuel ratio becomes rich to a certain degree. In the embodiment shown in FIG. 10, to purify the $NO_x$ using this characteristic, a three-way catalyst 23 is provided downstream of the $NO_x$ absorbent 19.

That is, as mentioned above, when the air-fuel mixture fed into the engine cylinder is made rich so as to release the $NO_x$ from the $NO_x$ absorbent 19, the $NO_x$ absorbed in the $NO_x$ absorbent 19 is abruptly released from the $NO_x$ absorbent 19. At this time, although the $NO_x$ is reduced at the releasing, there is a possibility that all the $NO_x$ is not reduced. However, when the three-way catalyst 23 is disposed downstream of the $NO_x$ absorbent 19, the $NO_x$ which was not reduced at the releasing is reduced by the three-way catalyst 23. Accordingly, by disposing the three-way catalyst 23 downstream of the $NO_x$ absorbent 19, the $NO_x$ purification performance can be further improved.

In the embodiments mentioned heretofore, as the $NO_x$ absorbent, use is made of an $NO_x$ absorbent 19 in which at least one substance selected from alkali metals, alkali earth metals, rare earth metals, and precious metals is carried on the alumina. However, it is possible to use a composite oxide of an alkali earth metal with copper, that, is a Ba—Cu—O system $NO_x$ absorbent, instead of the use of such an $NO_x$ absorbent 19. As such a composite oxide of the alkali earth metal with copper, use can be made of, for example, $MnO_2 \cdot BaCuO_2$. In this case, platinum Pt or cerium Ce can be added.

In this Ba—Cu—O system $NO_x$ absorbent, the copper Cu performs the same catalytic function as that of the platinum Pt of the $NO_x$ absorbent 19 mentioned heretofore. When the air-fuel ratio is lean, the $NO_x$ is oxidized by the copper Cu ($2NO+O_2 \rightarrow 2NO_2$) and diffused in the absorbent in the form of the nitric acid ions $NO_3^-$. On the other hand, when the air-fuel ratio is made rich, similarly the $NO_x$ is released from the absorbent, and this $NO_x$ is reduced by the catalytic function of the copper Cu. However, the $NO_x$ reduction force of the copper Cu is weaker in comparison with the $NO_x$ reduction force of the platinum Pt, and accordingly where the Ba—Cu—O system absorbent is used, an amount of $NO_x$ which is not reduced at the releasing of $NO_x$ is slightly increased in comparison with the $NO_x$ absorbent 19 mentioned heretofore. Accordingly, where the Ba—Cu—O system absorbent is used, as shown in FIG. 10, preferably the three-way catalyst 23 is disposed downstream of the absorbent.

Figure 11:
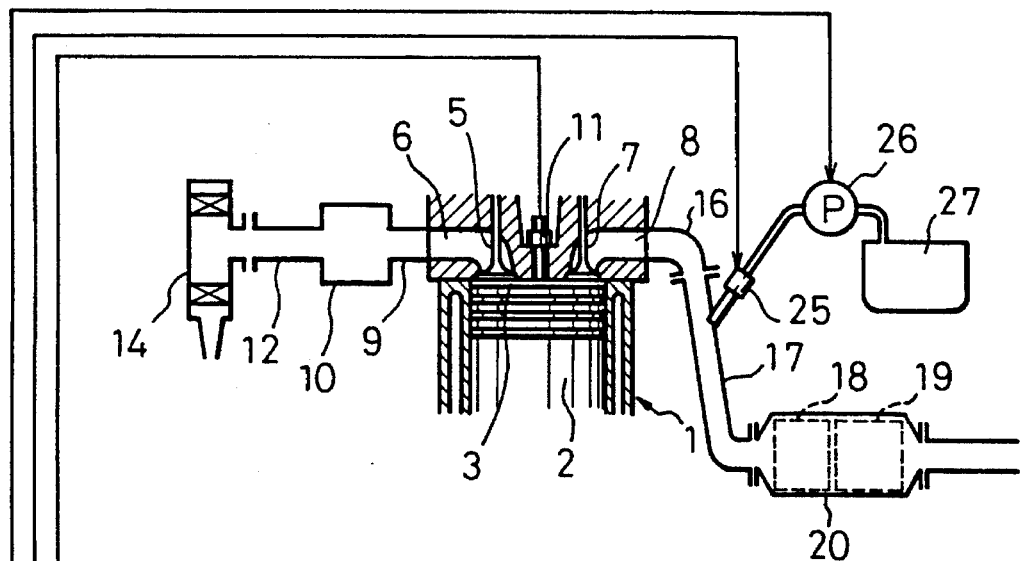
FIG. 11 is an overall view showing still another embodiment of the internal combustion engine.
Figure 11:
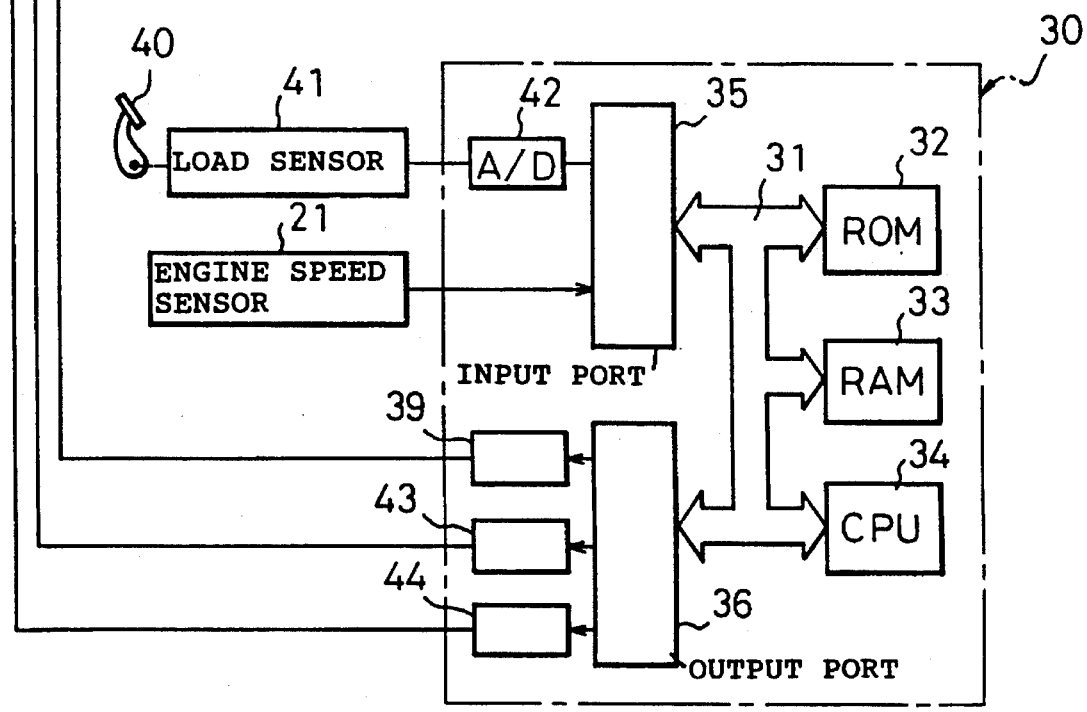

FIG. 11 show a case where the present invention is applied to a diesel engine. Note that, in FIG. 11, the same constituent elements as those in FIG. 1 are shown by the same reference numerals.

In the diesel engine, usually, in all operation states, combustion is carried out in a state where the excessive air ratio is more than 1.0 that is, the average air-fuel ratio of the air-fuel mixture in the combustion chamber 3 is lean. Accordingly, the $NO_x$ discharged at this time is absorbed into the $NO_x$ absorbent 19. On the other hand, when the $NO_x$ should be released from the $NO_x$ absorbent 19, the air-fuel ratio of the inflowing exhaust gas to the $NO_x$ absorbent 19 is made rich. In this case, in the embodiment shown in FIG. 11, the average air-fuel ratio of the air-fuel mixture in the combustion chamber 3 is made lean, and the hydrocarbon is fed into the exhaust passage of engine upstream of the $NO_x$ absorbent 19, whereby the air-fuel ratio of the inflowing exhaust gas to the $NO_x$ absorbent 19 is made rich.

Referring to FIG. 11, in this embodiment, a load sensor 41 generating an output voltage proportional to the amount of depression of the accelerator pedal 40 is provided, and the output voltage of this load sensor 41 is input via the AD converter 42 to the input port 35. Also, in this embodiment, a reducing agent supply valve 25 is disposed in the exhaust pipe 17, which reducing agent supply valve 25 is connected via the supply pump 26 to the reducing agent tank 27. The output port 36 of the electronic control unit 30 is connected to the reducing agent supply valve 25 and the supply pump 26 via the driving circuits 43, 44. In the reducing agent tank 27 is filled a hydrocarbon such as gasoline, isoctane, hexane, heptane, light oil, kerosine, or the like or a hydrocarbon such as butane, propane, or the like which can be stored in the state of a liquid.

In this embodiment, usually the air-fuel mixture in the combustion chamber 3 is burned under an excess air state, that is, in a state where the average air-fuel ratio is lean. At this time, the $NO_x$ discharged from the engine is absorbed into the $NO_x$ absorbent 19. When the $NO_x$ should be released from the $NO_x$ absorbent 19, the supply pump 26 is driven and, at the same time, the reducing agent supply valve 25 is opened, whereby the hydrocarbon filled in the reducing agent tank 27 is supplied from the reducing agent supply valve 25 to the exhaust pipe 17 for a predetermined time, for example, about 5 seconds to 20 seconds. The amount of supply of the hydrocarbon at this time is determined so that the air-fuel ratio of the inflowing exhaust gas flowing into the $NO_x$ absorbent 19 becomes rich. Accordingly, at this time, the $NO_x$ is released from the $NO_x$ absorbent 19.

Figure 12:
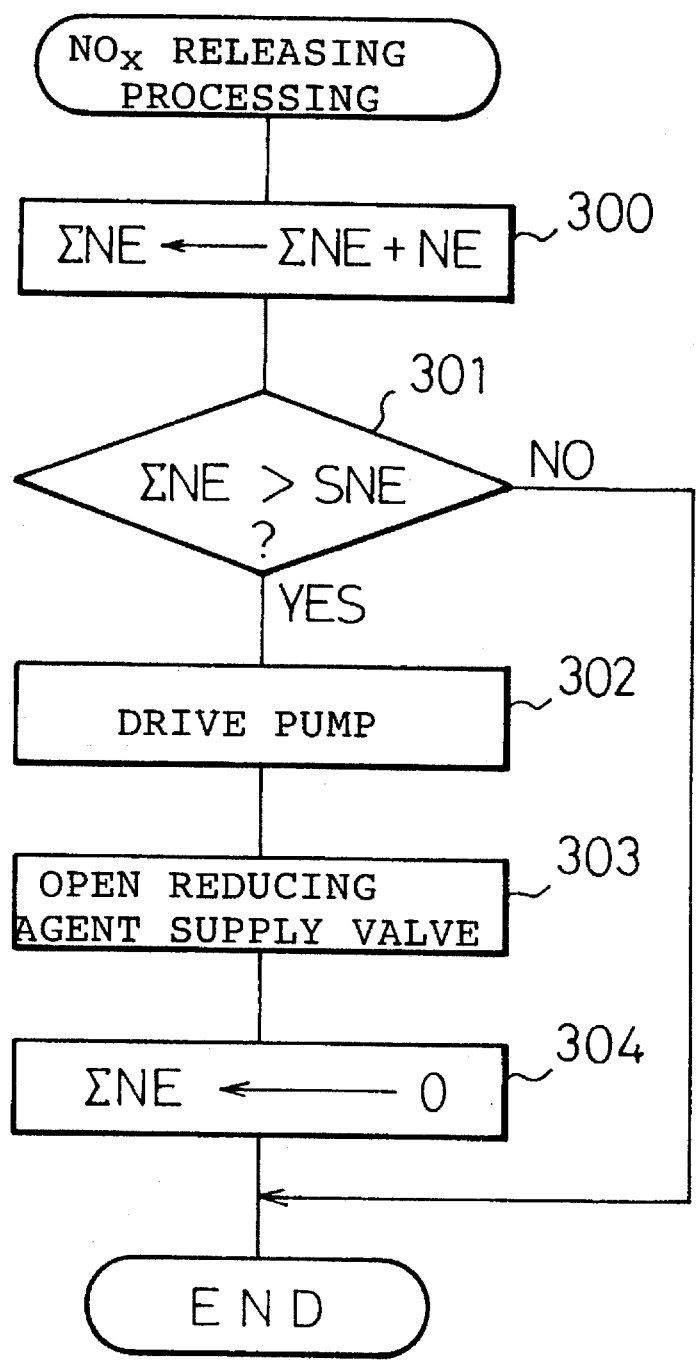
FIG. 12 is a flow chart for performing the $NO_x$ releasing processing.

FIG. 12 shows a routine for executing the $NO_x$ releasing processing, which routine is executed by interruption at every predetermined time interval.

Referring to FIG. 12, first of all, at step 300, a result obtained by adding $\Sigma NE$ to the present engine rotational speed NE is defined as $\Sigma NE$. Accordingly, this $\Sigma NE$ indicates the cumulative value of the engine speed NE. Subsequently, at step 301, it is judged whether or not the cumulative engine speed $\Sigma NE$ is larger than the predetermined value SNE. This predetermined value SNE indicates a cumulative engine speed from which it is estimated that the $NO_x$ in an amount of, for example, 50% of the $NO_x$ absorption ability of the $NO_x$ absorbent 19 is absorbed therein. When $\Sigma NE \leq SNE$, the processing cycle is completed, and when $\Sigma NE > SNE$, that is, when it is estimated that the $NO_x$ in an amount of 50% of the $NO_x$ absorption ability of the $NO_x$ absorbent 19 is absorbed therein, the processing routine goes to step 302, where the supply pump 26 is driven for a predetermined time, for example, about 5 seconds to 20 seconds. Subsequently, at step 303, the reducing agent supply valve 25 is opened for a predetermined time, for example, about 5 seconds to 20 seconds, and subsequently, at step 304, the cumulative engine speed $\Sigma NE$ is brought to zero.

In all the embodiments, an $NO_x$ oxidizing agent 18 is disposed upstream of the $NO_x$ absorbent 19. Therefore, even during engine low load operation where the temperature of the exhaust gas becomes lower, the $NO_x$ can be absorbed well into the $NO_x$ absorbent 19.

We claim:

1. An exhaust purification device of an internal combustion engine wherein an $NO_x$ absorbent which absorbs the $NO_x$ when an air-fuel ratio of an inflowing exhaust gas is lean and releases an absorbed $NO_x$ when the oxygen concentration in the inflowing exhaust gas is lowered is disposed in an exhaust passage of the engine, an $NO_x$ oxidizing agent which can oxidize the $NO_x$ is disposed in the engine exhaust passage upstream of the $NO_x$ absorbent, and the $NO_x$ absorbed in the $NO_x$ absorbent when the exhaust gas flowing into the $NO_x$ absorbent is lean is released from the $NO_x$ absorbent by means to lower the oxygen concentration in the exhaust gas flowing into the $NO_x$ absorbent.

2. An exhaust purification device of an internal combustion engine according to claim 1, wherein the $NO_x$ absorbed in the $NO_x$ absorbent is released from the $NO_x$ absorbent by making the exhaust gas flowing into the $NO_x$ absorbent the stoichiometric air-fuel ratio or richer.

3. An exhaust purification device of an internal combustion engine according to claim 1, wherein a time for which the air-fuel ratio of the exhaust gas flowing into the $NO_x$ absorbent is made lean and the $NO_x$ is absorbed in the $NO_x$ absorbent is 50 times or more longer than the time for which the oxygen concentration in the exhaust gas flowing into the $NO_x$ absorbent is lowered so as to release the $NO_x$ from the $NO_x$ absorbent.

4. An exhaust purification device of an internal combustion engine according to claim 1, wherein the air-fuel ratio of the exhaust gas flowing into the $NO_x$ absorbent is more than 18.0 when the $NO_x$ is absorbed into the $NO_x$ absorbent.

5. An exhaust purification device of an internal combustion engine according to claim 1, wherein the $NO_x$ oxidizing agent oxidizes the $NO_x$ by a temperature of the $NO_x$ oxidizing agent lower than the temperature of the $NO_x$ absorbent by which the $NO_x$ absorbent can absorb the $NO_x$ alone.

6. An exhaust purification device of an internal combustion engine according to claim 5, wherein the $NO_x$ oxidizing agent includes at least one substance selected from platinum, ceria, lanthancobaltperovskite, and vanadium pentaoxide.

7. An exhaust purification device of an internal combustion engine according to claim 1, wherein the $NO_x$ oxidizing agent is disposed near the $NO_x$ absorbent.

8. An exhaust purification device of an internal combustion engine according to claim 7, wherein the $NO_x$ oxidizing agent and the $NO_x$ absorbent are disposed in the same casing.

9. An exhaust purification device of an internal combustion engine according to claim 1, wherein the $NO_x$ absorbent contains at least one substance selected from alkali metals comprising potassium, sodium, lithium, or cesium, alkali earth metals comprising barium or calcium, rare earth metals comprising lanthanum or yttrium and contains platinum.

10. An exhaust purification device of an internal combustion engine according to claim 1, wherein the $NO_x$ absorbent comprises a composite oxide of barium and copper.

11. An exhaust purification device of an internal combustion engine according to claim 1, further comprising air-fuel ratio control means for controlling the air-fuel ratio of the air-fuel mixture formed in an engine combustion chamber, and the absorption of $NO_x$ into the $NO_x$ absorbent and the releasing of $NO_x$ from the $NO_x$ absorbent are controlled by controlling the air-fuel ratio of the air-fuel mixture formed in the engine combustion chamber by said air-fuel ratio control means.

12. An exhaust purification device of an internal combustion engine according to claim 11, wherein said air-fuel ratio control means makes the air-fuel ratio of the air-fuel mixture formed in the combustion chamber lean when the $NO_x$ should be absorbed into the $NO_x$ absorbent and makes the air-fuel ratio of the air-fuel mixture formed in the combustion chamber the stoichiometric air-fuel ratio or rich when the $NO_x$ should be released from the $NO_x$ absorbent.

13. An exhaust purification device of an internal combustion engine according to claim 12, wherein the internal combustion engine comprises a gasoline engine and said air-fuel ratio control means controls the absorption of $NO_x$ into the $NO_x$ absorbent and the releasing of $NO_x$ from the $NO_x$ absorbent by controlling the fuel amount supplied to the engine.

14. An exhaust purification device of an internal combustion engine according to claim 13, wherein said air-fuel ratio control means maintains the air-fuel ratio of the air-fuel mixture formed in the combustion chamber at almost a constant lean air-fuel ratio of more than 18.0 when the $NO_x$ should be absorbed into the $NO_x$ absorbent.

15. An exhaust purification device of an internal combustion engine according to claim 13, further comprising memory means which stores in advance the amount of fuel determined in accordance with the operation state of the engine, and said air-fuel ratio control means determines the amount of fuel supplied to the engine based on the fuel amount stored in said memory means.

16. An exhaust purification device of an internal combustion engine according to claim 1, wherein air-fuel ratio control means which controls the air-fuel ratio of the exhaust gas released from the engine combustion chamber and flowing into the $NO_x$ absorbent is provided in the engine exhaust passage, and said air-fuel ratio control means is used to control the air-fuel ratio of the exhaust gas flowing into the $NO_x$ absorbent so as to control the absorption of $NO_x$ into the $NO_x$ absorbent and the releasing of $NO_x$ from the $NO_x$ absorbent.

17. An exhaust purification device of an internal combustion engine according to claim 16, wherein said air-fuel ratio control means makes the air-fuel ratio of the exhaust gas flowing into the $NO_x$ absorbent lean when the $NO_x$ should be absorbed into the $NO_x$ absorbent, while makes the air-fuel ratio of the exhaust gas flowing into the $NO_x$ absorbent the stoichiometric air-fuel ratio or rich when the $NO_x$ should be released from the $NO_x$ absorbent.

18. An exhaust purification device of an 10 internal combustion engine according to claim 17, wherein said air-fuel ratio control means supplies a reducing agent to an interior of the exhaust passage of the engine when the $NO_x$ should be released from the $NO_x$ absorbent.

19. An exhaust purification device of an internal combustion engine according to claim 18, wherein said reducing agent is made of a hydrocarbon.

20. An exhaust purification device of an internal combustion engine according to claim 19, wherein said hydrocarbon comprises at least one member selected from gasoline, isoctane, hexane, heptane, light oil, kerosinem butane, and propane.

21. An exhaust purification device of an internal combustion engine according to claim 1, further comprising $NO_x$ releasing control means which lowers the oxygen concentration in the exhaust gas flowing into the $NO_x$ absorbent only for a second set-up period preliminarily determined so as to release the $NO_x$ from the $NO_x$ absorbent when the period for which the air-fuel ratio of the exhaust gas flowing into the $NO_x$ absorbent is made lean and the $NO_x$ is absorbed into the $NO_x$ absorbent exceeds a preliminarily determined first set-up period.

22. An exhaust purification device of an internal combustion engine according to claim 21, wherein said $NO_x$ releasing control means makes the air-fuel ratio of the exhaust gas flowing into the $NO_x$ absorbent the stoichiometric air-fuel ratio or rich when the $NO_x$ should be released from the $NO_x$ absorbent.

23. An exhaust purification device of an internal combustion engine according to claim 21, wherein said $NO_x$ releasing control means is provided with $NO_x$ amount estimation means for estimating the amount of $NO_x$ absorbed into the $NO_x$ absorbent, and said $NO_x$ discharging control means decides that said first set-up period has lapsed when the amount of $NO_x$ estimated by said $NO_x$ amount estimation means exceeds a preliminarily determined set-up amount.

24. An exhaust purification device of an internal combustion engine according to claim 23, wherein said $NO_x$ amount estimation means decides that the amount of $NO_x$ absorbed in the $NO_x$ absorbent exceeds said set-up amount when the cumulative value of an engine speed exceeds a preliminarily determined set-up value.

25. An exhaust purification device of an internal combustion engine according to claim 23, wherein said $NO_x$ amount estimation means decides that substantially all of the $NO_x$ absorbed in the $NO_x$ absorbent was released when the air-fuel ratio of the air-fuel mixture formed in the engine combustion chamber is maintained at the stoichiometric air-fuel ratio or is rich for more than a predetermined time.

26. An exhaust purification device of an internal combustion engine according to claim 21, wherein said second set-up period is substantially 20 seconds or less.

27. An exhaust purification device of an internal combustion engine according to claim 1, wherein a catalyst which can reduce at least the $NO_x$ is disposed in the exhaust passage of the engine downstream of the $NO_x$ absorbent.

28. An exhaust purification device of an internal combustion engine according to claim 27, wherein said catalyst comprises a three-way catalyst.

* * * * *

UNITED STATES PATENT AND TRADEMARK OFFICE
CERTIFICATE OF CORRECTION

PATENT NO. : 5,471,836
DATED : December 5, 1995
INVENTOR(S) : Takeshima Shinichi, et al.

It is certified that error appears in the above-indentified patent and that said Letters Patent is hereby corrected as shown below:

| Column | Line | |
|---|---|---|
| 2  | 11 | Change "processing" to --process--. |
| 4  | 50 | Change "$NO_z$" to --$NO_2$--. |
| 4  | 63 | Change "rich;" to --rich,--. |
| 5  | 65 | Change "diffuses" to --diffused--. |
| 9  | 11 | Change "18" to --19--. |
| 12 | 55 | Delete "10". |
| 12 | 66 | Change "kerosinem" to --kerosine,--. |

Signed and Sealed this

Twenty-first Day of May, 1996

Attest:

BRUCE LEHMAN

Attesting Officer       Commissioner of Patents and Trademarks